July 15, 1969   V. E. STRAUGHAN   3,455,758
METHOD AND APPARATUS FOR THE MANUFACTURE OF PLASTIC BELTS
Filed Dec. 2, 1965

INVENTOR
Virgil E. Straughan

BY Lawrence I. Field

ATTORNEY

United States Patent Office 3,455,758
Patented July 15, 1969

3,455,758
METHOD AND APPARATUS FOR THE MANUFACTURE OF PLASTIC BELTS
Virgil E. Straughan, Euclid, Ohio, assignor to Horizons Research Incorporated, a corporation of Ohio
Filed Dec. 2, 1965, Ser. No. 511,054
Int. Cl. B65c 37/00; B29c 17/04; B29d 23/10
U.S. Cl. 156—215                        6 Claims

ABSTRACT OF THE DISCLOSURE

An apparatus for manufacturing endless belts of polyester in which a first lamina of the polyester is wrapped around a vacuum chuck with the ends butted together and then a second lamina is wrapped around the first lamina and the two lamina are secured to one another by an adhesive.

---

This invention relates to flexible endless belts of polyester and to a novel procedure for their manufacture.

Polyester resins, particularly polyethylene terephthalates such as those described in U.S. Patent 2,465,150 or 2,465,319 and improvements thereon, are possessed of high tensile strength as compared with other synthetic polymers and as a consequence constitute a very desirable material for the transmission of power when fabricated into the form of an endless belt.

In such belts and in other similar products it is necessary that the belt surface be free from surface discontinuities such as are presented by lap joints usch as exist when a sheet of polyester is wrapped several times around a mandrel or other support.

The present invention provides a method for fabricating a tube or endless belt of Mylar (polyethylene terephthalate) polyester which is of uniform thickness throughout its length, which belt consists of two pieces of polyester wrapped one inside the other with their respective ends abutted as butt joints, diametrically opposite to one another.

Figure 1:
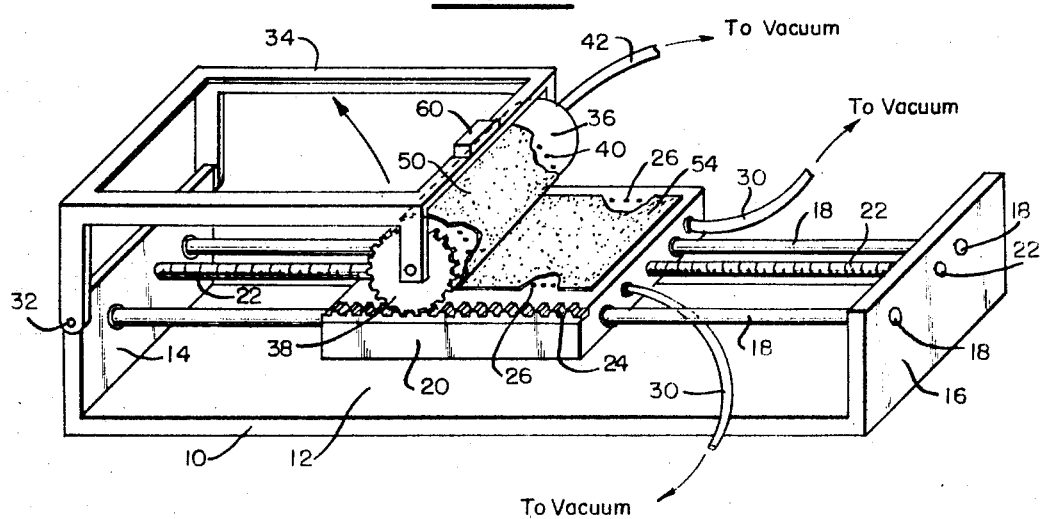
Figure 2:
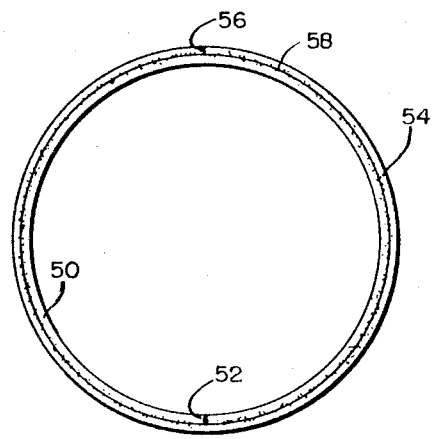

The invention will be more fully understood by reference to the description which follows and to the drawings in which FIGURE 1 is a view in perspective showing an apparatus for producing the belt of FIGURE 2; and FIGURE 2 is a plan view of the belt of this invention.

The apparatus by means of which the endless loops are formed comprises a frame 10, including a flat base portion 12 and vertical walls 14, 16 at opposite ends thereof. Two horizontal rods 18 extend between wall 16 and wall 14 and serve as supports for a table 20 which is provided with bores which permit it to slide on bars 18 as it is caused to move by a drive screw 22 which is rotatably supported in walls 16 and 14.

The upper surface of table 20 is provided with a rack 24 extending along the length of one edge of the table and with a series of holes 26 pierced in the top of table 20 and terminating at one or more internal bores within table 20, extending to the outside of the table where the bores are each connected by flexible hoses 30 to a vacuum pump so that a vacuum may be applied to perforations 26.

At one end of frame 10, connected to the vertical wall 14 by hinge pin 32 is a bracket 34 adapted to support a roll 36 carrying a pinion gear 38 which meshes with rack 24 when bracket 34 is rotated about hinge 32.

Roll 36 is provided with a series of perforations 40 which extend to a bore in the roll body, the bore being connected by hose 42 to a source of vacuum, or to a supply of compressed air.

The manner in which the loop of FIGURE 2 is formed is as follows:

The loop of FIGURE 2 consists of an inner layer 50 formed by bringing two opposite edges of a first strip together so as to form a butt joint 52, and an outer wrap 54 formed by wrapping a second strip or sheet in the same manner so as to form a second butt joint 56, located opposite to butt joint 52. The two wraps are held together by a layer of an adhesive 58.

Any commercially available adhesive for polyester materials can be used, a thin uniform layer of the adhesive being applied to the two strips or sheets to be laminated and then allowed to dry to a substantially tack-free state.

Thereafter the strips were laminated by using the apparatus of FIGURE 1. Strip 50 was wrapped around a vacuum chuck roller 36 with the adhesive coated side out. This strip had been previously cut to the exact length required for it to completely encircle roller 36 and have its ends come together to form butt joint 52.

The outer wrap 54 was placed on table 20 after having been cut to the exact length required for it to fit around wrap 50, the adhesive coated side of strip 54 was facing up, as shown.

Roller 36 is lowered onto the table 20 at a position such that after wrapping the two butt joints 52 and 56 will be substantially diametrically opposite.

A pinion 38 on roller 36 engages a rack 24 on table 20 and the two adhesive coated strips contact one another. Both the roller 36 and the table 20 are connected to a vacuum producing pump (not shown), the vacuum being applied through holes 40 and 26 in order to hold wraps 50 and 54 to the roller 36 and table 20 respectively.

One complete revolution of the roller 36 results in lifting wrap 54 from the table and onto the inner wrap 50, thus completing the belt.

It is helpful to apply pressure while making the laminated belt. This may be accomplished by adding weight to bracket 34 supporting roll 36. Pressures of 100 to 1,000 lbs./sq. in. were found to be useful in eliminating voids or gas bubbles between layers.

The belt may be removed more easily from the evacuated roller if the chuck and/or the belt has first been coated with a very thin layer of Teflon (tetrafluoroethylene). Furthermore, vacuum is replaced by air pressurized to about 35 lbs./sq. in. which allows the belt to be floated off roller 36.

No heat curing was required to produce a strong bond between the two flexible layers when this invention was actually reduced to practice. Layers 50 and 54 were each of Mylar 0.75 mil thick, but thicker or thinner material could be used.

The resulting belt was flexible and exhibited the high tensile strength characteristic of Mylar. The tensile strength was found to be in excess of 15,000 lbs./sq. in. at 25° C.

After a belt has been fabricated, a third lamina may be added by coating the outer surface of the belt with adhesive and rolling it in contact with a third lamina placed on table 20. Obviously there is no theoretical limit to the total number of lamina which could be built up in this manner.

I claim:
1. An apparatus for forming flexible endless loops of polyester from at least two individual lamina, each of which consists of a thin sheet of parallelogram shape, which apparatus comprises:
   a vacuum table having a flat upper surface adapted to support a first lamina, first vacuum applying means communicating with the surface of said table for holding said lamina against the surface of said table;
   a vacuum chuck having a generally cylindrical surface about which a second lamina can be wrapped, second vacuum applying means communicating with the surface of said chuck for holding a second lamina against the surface of said chuck;

means providing for said chuck to be engaged by said vacuum table and for relative movement between said chuck and said table whereby the chuck rolls across the surface of said table and said first lamina and said second lamina are united in face to face relationship with the opposite ends of said first lamina abutted to one another to form a first butt joint and the opposite ends of said second lamina abutted to one another to form a second butt joint.

2. The apparatus of claim 1 including an additional means to release the vacuum applied to said chuck after the lamina from the table has been transferred to the chuck.

3. The apparatus of claim 2 wherein said additional means comprises a source of air under pressure.

4. The apparatus of claim 1 including in addition means to urge the chuck into engagement with the table.

5. The apparatus of claim 1 wherein the vacuum chuck is provided with a gear which meshes with a toothed track on the vacuum table.

6. The method of forming an endless flexible loop of polyester which comprises:

looping a first lamina about a vacuum chuck of generally cylindrical shape and of such a size that the opposite ends of said lamina abut one another;

applying a vacuum to one surface of said lamina so as to hold the lamina wrapped around said chuck;

positioning a second lamina on the surface of a vacuum table;

applying a vacuum to one surface of said second lamina to hold it on said table;

applying an adhesive to the outer surface of said first lamina and to the exposed surface of said second lamina;

permitting the adhesive to dry to a substantially tack-free state;

bringing the adhesively coated first lamina into physical contact with said adhesively coated second lamina;

and thereafter moving said first lamina over the surface of said second lamina so that said adhesives unite and said second lamina wraps itself around said first lamina, the relative positions of the two lamina being such that the butt joint of the inner lamina and the butt joint of the outer lamina are offset with respect to one another, along the perimeter of said loop, and removing the completed loop from said vacuum chuck.

References Cited
UNITED STATES PATENTS

| | | | |
|---|---|---|---|
| 661,108 | 11/1900 | Schmitz | 138—140 XR |
| 1,855,041 | 4/1932 | Bodony | 156—218 |
| 2,650,213 | 8/1953 | Hofrichter | 260—75 |

EARL M. BERGERT, Primary Examiner

M. E. McCAMISH, Assistant Examiner

U.S. Cl. X.R.

156—218